(12) United States Patent
Raveendran

(10) Patent No.: US 12,023,986 B2
(45) Date of Patent: Jul. 2, 2024

(54) VEHICULAR COMPARTMENT WITH INTELLIGENT HEATING AND COOLING SYSTEM

(71) Applicant: Magna Electronics Inc., Auburn Hills, MI (US)

(72) Inventor: Bishnu Raveendran, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 398 days.

(21) Appl. No.: 17/445,314

(22) Filed: Aug. 18, 2021

(65) Prior Publication Data

US 2022/0055446 A1 Feb. 24, 2022

Related U.S. Application Data

(60) Provisional application No. 62/706,445, filed on Aug. 18, 2020.

(51) Int. Cl.
| | |
|---|---|
| *B60H 1/00* | (2006.01) |
| *G05B 15/02* | (2006.01) |
| *G06V 20/59* | (2022.01) |

(52) U.S. Cl.
CPC ..... *B60H 1/00771* (2013.01); *B60H 1/00499* (2019.05); *B60H 1/00792* (2013.01); *B60H 1/00985* (2013.01); *G05B 15/02* (2013.01); *G06V 20/59* (2022.01)

(58) Field of Classification Search
CPC ............ B60H 1/00771; B60H 1/00499; B60H 1/00792; B60H 1/00985; B60H 1/00592; B60H 1/00271; G05B 15/02; G06V 20/59; B60R 7/02; G05D 23/19
See application file for complete search history.

(56) References Cited

U.S. PATENT DOCUMENTS

| | | | |
|---|---|---|---|
| 6,254,261 B1 | 7/2001 | Bingle et al. | |
| 6,485,081 B1 | 11/2002 | Bingle et al. | |
| 7,038,577 B2 | 5/2006 | Pawlicki et al. | |
| 7,720,580 B2 | 5/2010 | Higgins-Luthman | |

(Continued)

FOREIGN PATENT DOCUMENTS

| | | | | |
|---|---|---|---|---|
| DE | 102012004821 A1 | * | 9/2013 | ......... B60H 1/00592 |
| WO | WO-2021098724 A1 | * | 5/2021 | ........... B60H 1/0025 |

*Primary Examiner* — Michael J Zanelli
(74) *Attorney, Agent, or Firm* — HONIGMAN LLP

(57) ABSTRACT

A vehicular compartment temperature control system includes an insulated compartment disposed within a vehicle. The system includes at least one cooling element at the insulated compartment and operable to cool an interior cavity of the insulated compartment. A temperature sensor senses temperature within the insulated compartment. An output of the temperature sensor is provided to a control to determine temperature of the interior cavity. The control, responsive to receiving a signal indicative of a user selected temperature that is selected by a user via operating a user input of the vehicular compartment temperature control system, and responsive to determination that the determined temperature of the interior cavity of the insulated compartment is greater than the user selected temperature by at least a threshold amount, controls the at least one cooling element to adjust temperature of the interior cavity of the insulated compartment toward the user selected temperature.

12 Claims, 2 Drawing Sheets

(56) References Cited

U.S. PATENT DOCUMENTS

| | | | |
|---|---|---|---|
| 7,855,755 B2 | 12/2010 | Weller et al. | |
| 9,809,085 B1 * | 11/2017 | Pierce | B60H 1/00985 |
| 10,071,687 B2 | 9/2018 | Ihlenburg et al. | |
| 10,099,614 B2 | 10/2018 | Diessner | |
| 11,634,062 B1 * | 4/2023 | Roy | B60H 1/00742 |
| | | | 296/24.41 |
| 2003/0126866 A1 * | 7/2003 | Spry | B60N 3/104 |
| | | | 62/3.61 |
| 2009/0218849 A1 * | 9/2009 | Rupar | B60R 5/04 |
| | | | 296/182.1 |
| 2017/0259648 A1 * | 9/2017 | Putcha | B60P 3/007 |
| 2017/0337437 A1 * | 11/2017 | Kanagaraj | G01G 19/08 |
| 2019/0047356 A1 * | 2/2019 | Ferguson | G08G 1/04 |
| 2020/0047654 A1 * | 2/2020 | Pine | B60R 25/01 |
| 2020/0108688 A1 * | 4/2020 | Gruber | H01M 10/656 |
| 2021/0155071 A1 * | 5/2021 | Lange | B60H 1/00271 |
| 2021/0268866 A1 * | 9/2021 | Zhang | G01G 19/12 |

* cited by examiner

VEHICULAR COMPARTMENT WITH INTELLIGENT HEATING AND COOLING SYSTEM

CROSS REFERENCE TO RELATED APPLICATION

The present application claims the filing benefits of U.S. provisional application Ser. No. 62/706,445, filed Aug. 18, 2020, which is hereby incorporated herein by reference in its entirety.

FIELD OF THE INVENTION

The present invention relates generally to a vehicular compartment and, more particularly, to an intelligently heated and cooled vehicular compartment.

BACKGROUND OF THE INVENTION

Use of separate coolers to provide a cooled compartment in the trunk of a vehicle is known. For example, a user may place a cooler with ice in the trunk compartment when going to the grocery store so the food can stay cool during the drive from the grocery store back to the user's home.

SUMMARY OF THE INVENTION

The present invention provides a vehicular compartment temperature control system that includes an insulated compartment disposed within a vehicle equipped with the vehicular compartment temperature control system. The system includes at least one cooling element at the insulated compartment and operable to cool an interior cavity of the insulated compartment. A temperature sensor senses temperature within the insulated compartment and a control includes electronic circuitry and associated software. An output of the temperature sensor is provided to the control, and the electronic circuitry of the control includes a processor for processing the output of the temperature sensor to determine temperature of the interior cavity of the insulated compartment. The control, responsive to receiving a signal indicative of a user selected temperature that is selected by a user via operating a user input of the vehicular compartment temperature control system, and responsive to determination that the determined temperature of the interior cavity of the insulated compartment is greater than the user selected temperature by at least a threshold amount, controls the at least one cooling element to adjust temperature of the interior cavity of the insulated compartment toward the user selected temperature.

These and other objects, advantages, purposes and features of the present invention will become apparent upon review of the following specification in conjunction with the drawings.

DESCRIPTION OF THE PREFERRED EMBODIMENTS

A vehicle compartment heating and cooling system or vehicular compartment temperature control system operates to intelligently heat and/or cool a compartment within a vehicle (e.g., at a trunk of the vehicle). The system may include additional sensors such as a global positioning system (GPS) sensor or a weight sensor or an imaging sensor (e.g., a camera). The system includes a processor or processing system that is operable to receive data from one or more sensors (e.g., temperature sensors, GPS sensors, weight sensors, image sensors, etc.) and to provide an output to a display device and/or to one or more heating/cooling devices within the compartment.

Figure 1:
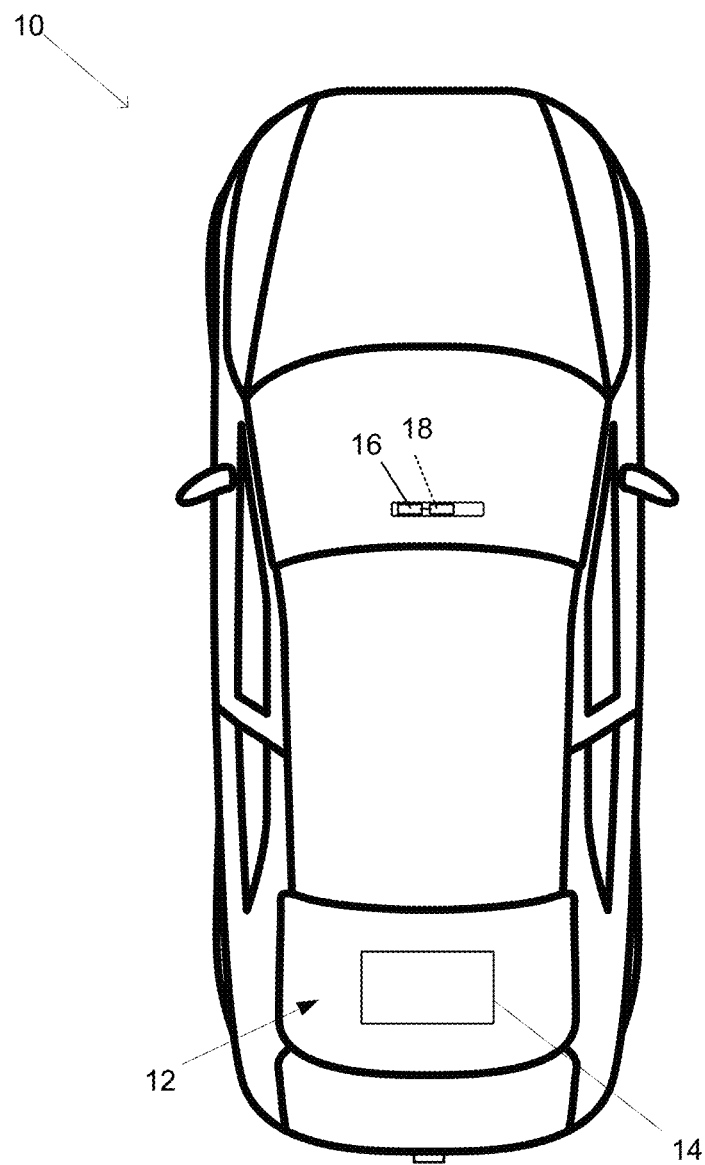
FIG. 1 is a plan view of a vehicle with a vehicular compartment that incorporates intelligent heating and cooling in accordance with the present invention.

Referring now to the drawings and the illustrative embodiments depicted therein, a vehicle 10 includes a vehicle compartment heating and cooling system 12 that includes at least one interior compartment 14 (FIG. 1). The vision system 12 includes a control or electronic control unit (ECU) 18 having electronic circuitry and associated software, with the electronic circuitry including a data processor and/or image processor that is operable to process data captured by sensors, whereby the ECU may determine conditions of the compartment 14 or the vehicle 10 or the environment and control aspects of the compartment 14 (e.g., the temperature) and/or display information on a display device 16 within the vehicle.

Vehicles are commonly used to transport items sensitive to temperature. For example, vehicles frequently transport groceries or other perishable food items that must be kept chilled or cold to prevent spoilage. As another example, vehicles often transport hot cooked food (e.g., from one residence to another). It would be advantageous for the vehicle to include a compartment that allows transport of cold and/or hot items without significant loss of temperature or other inconveniences (e.g., ensuring that the grocery store is the last stop of a trip).

Figure 2:
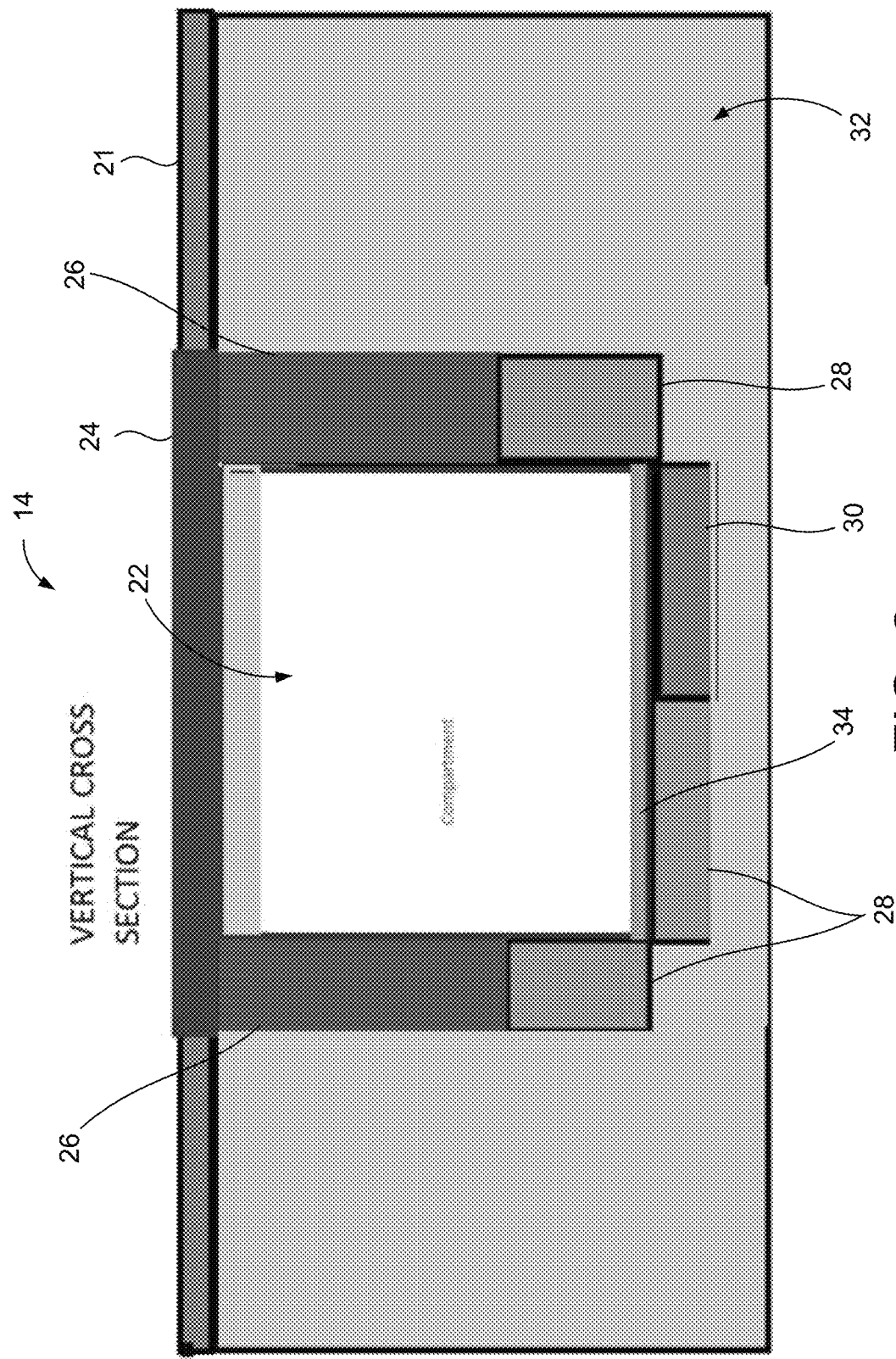
FIG. 2 is cross-sectional view of the vehicular compartment.

Referring now to FIG. 2, the compartment heating and cooling system 12 includes at least one compartment 14 surrounded by thermal insulation 32. Optionally, the compartment 14 is located within the trunk of the vehicle. For example, the compartment 14 may be set into the trunk such that a top of the compartment 14 is flush or nearly flush with the trunk floor 21 such that the user opens a door or lid to the compartment and places items into the compartment to store the items lower than the floor of the trunk. However, the compartment 14 may be located anywhere within the vehicle. The compartment 14 may include an insulated door 24 to allow access to the cavity 22 and/or the receptacles 26. The door 24 may be approximately flush with the floor of the trunk 21 of the vehicle (or generally flush with a side wall of the trunk if the compartment is at a side region of the trunk optionally above the floor of the trunk).

The compartment 14 includes a cavity 22 for storing items. The walls of the compartment 14 may include recesses or receptacles 26 for placing removable/disposable/rechargeable cooling and/or heating packs. The receptacles 26 may be located between the thermal insulation 32 and the cavity 22 such that the cooling/heating packs cool/heat the cavity 22 and its contents and not the remainder of the vehicle. Alternatively or additionally, the system includes one or more cooling elements 28 and/or one or more heating elements 30. The cooling elements 28 and heating elements 30 may be powered by the vehicle (e.g., by the vehicle's battery system) and controlled by the ECU 18 (or other processing system). The cooling elements 28 and heating elements 30 may be integrated into the vehicle's heating, ventilation, and air conditioning (HVAC) system or be an entirely independent system. The system may also be powered via other disposable or rechargeable means (e.g., batteries located at or near the compartment 14, solar panels located on the vehicle, etc., or the system may include one or more batteries that are charged via a solar panel disposed at an exterior surface of the vehicle). The cooling elements 28 may cool the compartment 14 via cool air (e.g., using the vehicle's air conditioning system) or using a coolant loop (i.e., cooling coils). Similarly, the heating elements 30 may comprise heating coils to warm the compartment 14. Alternatively, heat from, for example, the engine or exhaust of the vehicle, may be channeled to or near the compartment and/or may circulate around or near the compartment 14 to for heating.

The cooling elements 28 and heating elements 30 may cooperate to maintain a stable temperature (e.g., a user-configurable temperature). The elements 28 may be supplemented by the heating/cooling packs stored (by a user) in the receptacles 26 (e.g., ice packs and the like). Optionally, a user may select the temperature via, for example, the display device 16 (such as a touch screen display within the cabin of the vehicle or optionally at the compartment). For example, a user may plan on storing perishable groceries within the compartment and, on the way to the grocery store, set the temperature of the compartment to 40 degrees Fahrenheit. Optionally, the system may provide simple configuration options to the user. For example, the system may include user inputs that set a disabled mode (i.e., no heating or cooling) and/or a cool mode (cool the compartment to a predetermined/selectable/configurable temperature) and/or a warm mode (warm the compartment to a predetermined/selectable/configurable temperature) or a hybrid mode that attempts to maintain the compartment 14 at a selectable or configurable temperature (or within a threshold amount of the selected temperature) regardless of whether that requires cooling or heating.

The compartment 14 may include a temperature sensor that provides temperature signal or data to the ECU (or other controller). The ECU may enable/disable the cooling elements 28 and/or heating elements 30 based on the desired or set compartment temperature (e.g., the temperature set by the user) and the current temperature in the compartment. The ECU may provide the current temperature of the compartment 14 to the user (e.g., via the display 16). The ECU may control the heating element or cooling element responsive to the determined current temperature of the compartment being at least a threshold amount (e.g., at least 5 degrees) less than or greater than the user selected temperature.

Optionally, the compartment 14 includes a weight sensor 34. The weight sensor may provide weight data to the ECU. The ECU may enable/disable cooling and/or heating of the compartment 14 based on the data received from the weight sensor 34. For example, when the compartment is cooling and weight is suddenly removed from the weight sensor 34 (i.e., a user has emptied the contents of the compartment 14), the ECU may disable cooling of the compartment. Alternatively, the ECU may base alerts/notifications to the user (e.g., via display on the display device 16) based on weight data. For example, the ECU may prompt the user to disable the cooling/heating of the compartment when weight is removed from the weight sensor or prompt the user to enable the cooling/heating when weight is added.

The compartment may include additional sensors to determine the contents of the compartment. For example, the compartment 14 may include one or more imaging sensors such as infrared or thermal cameras, ultrasonic sensors, etc. The cameras or other sensors may determine presence of objects within the compartment to help control the cooling/heating elements 28, 30. The image sensors may classify the objects to determine whether heating and/or cooling is necessary. For example, the cameras may identify a gallon of milk and determine that cooling may be needed and either prompt the user or automatically begin cooling. The sensors may also determine a temperature of objects placed within the compartment 14. For example, when a cold object (e.g., less than 50 degrees Fahrenheit) is placed within the compartment 14, the ECU may automatically begin cooling of the compartment 14. Alternatively, when a hot object (e.g., greater than 100 degrees Fahrenheit) is placed within the compartment 13, the ECU may automatically begin heating of the compartment 14.

Optionally, the ECU may receive an output or data from a GPS sensor and the ECU may at least partially control the cooling and/or heating of the compartment based on the GPS data. For example, when the vehicle stops at or is parked at a location that the GPS sensor indicates is a grocery store, the ECU may prompt the user to enable cooling of the compartment (or, alternatively, automatically begin cooling of the compartment). Additionally or alternatively, the system may determine that the vehicle is parked at a location that the vehicle was previously at when the compartment 14 was cooled and/or heated and prompt the user or adjust the temperature of the compartment 14 accordingly. The system may store locations where cooling and/or heating were used in non-volatile memory disposed at the vehicle. Optionally, the system may determine when the vehicle ignition is off in addition to determining vehicle location. A machine learning algorithm or other logic may determine (based on ignition status, vehicle location or direction, outside weather conditions, date, time, etc.) whether to prompt the user or initiate automatic precooling or preheating of the compartment 14.

The system, in some scenarios, may automatically enable and/or disable heating or cooling of the compartment 14 (i.e., enable or disable heating and cooling of the compartment without user intervention). For example, the system may automatically initiate cooling of the compartment when the system determines that the vehicle is parked at a grocery store (or heating of the compartment when the system determines that the vehicle is parked at a restaurant or similar). That is the system, in response to determining that the vehicle enters or parks at a predetermined location (e.g., a grocery store), the system may enable pre-cooling of the compartment. When the system determines that the vehicle is no longer parked or located at the grocery store or other predetermined location (e.g., based on a GPS sensor, movement of the vehicle, gear of the vehicle, etc.) and further determines that no items are stored in the compartment (e.g., via a weight sensor, temperature sensor, a camera, etc.), the system may determine that the compartment is not in use and automatically disable heating or cooling (i.e., disable heating or cooling without user intervention). Thus, the system may autonomously enable and/or disable heating and/or cooling of the compartment based on the location/state of the vehicle and the contents of the compartment.

For example, when the vehicle is parked at a grocery store, the system operates the cooling device to initiate pre-cooling of the compartment (e.g., to lower the temperature of the compartment to a temperature sufficient to preserve cold food purchased from the grocery store). The vehicle user may then place items in the compartment after shopping at the grocery store, and the vehicle may be driven away from the store. Because items are present in the compartment, the system maintains cooling of the compartment. When the items are later removed from the compartment (such as at the user's home), the system determines that the compartment is empty and deactivates the cooling device. Optionally, the system may generate an alert when the compartment is not empty and the vehicle is parked, so that the system does not continue to cool the compartment for a prolonged period of time after the vehicle is parked (which may be indicative of the user parking the vehicle at home but forgetting about the grocery items in the compartment), in order to avoid excessive drain on the vehicle's battery. The alert may comprise actuation of the vehicle lights and/or horn or may comprise a text message or other message or alert sent to the user's smart phone or other user device.

Optionally, the system may include multiple compartments 14. For example, one compartment may be for cold items while another compartment may be for hot items. Each compartment may be individually temperature controlled via, for example, the touch screen or display device.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system may include an image processor operable to process image data captured by any camera or cameras, such as for detecting objects within the compartment. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect objects. Responsive to such image processing, and when an object is detected, the system may generate an alert to the driver of the vehicle.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular compartment temperature control system, the vehicular compartment temperature control system comprising:
    an insulated compartment disposed within a vehicle equipped with the vehicular compartment temperature control system;
    at least one cooling element at the insulated compartment and operable to cool an interior cavity of the insulated compartment;
    a temperature sensor sensing temperature within the insulated compartment;
    a GPS sensor that generates an output representative of a current location of the equipped vehicle;
    a control comprising electronic circuitry and associated software;
    wherein an output of the temperature sensor is provided to the control, and wherein the electronic circuitry of the control comprises a processor for processing the output of the temperature sensor to determine temperature of the interior cavity of the insulated compartment;
    wherein the control, responsive to determination that the current location of the equipped vehicle is at a predetermined location and responsive to determination that the determined temperature of the interior cavity of the insulated compartment is greater than a threshold temperature, controls the at least one cooling element to initiate pre-cooling of the interior cavity of the insulated compartment; and
    wherein the control, after initiating pre-cooling of the interior cavity of the insulated compartment, and responsive to determination that the vehicle is no longer parked at the predetermined location, and responsive to determination that the insulated compartment is empty, disables the pre-cooling of the interior cavity of the insulated compartment.

2. The vehicular compartment temperature control system of claim 1, further comprising at least one heating element, wherein the control, responsive to receiving a user selected temperature, and responsive to determination that the determined temperature of the interior cavity of the insulated compartment is less than the user selected temperature by at least a threshold amount, controls the at least one heating element to adjust the temperature of the interior cavity of the insulated compartment toward the user selected temperature.

3. The vehicular compartment temperature control system of claim 2, further comprising a weight sensor disposed within the insulated compartment, and wherein the control controls the at least one cooling element to cool the insulated compartment responsive at least in part to determination, responsive to an output of the weight sensor, of presence of at least one item in the insulated compartment.

4. The vehicular compartment temperature control system of claim 2, wherein the insulated compartment is disposed within a trunk of the equipped vehicle.

5. The vehicular compartment temperature control system of claim 4, wherein the insulated compartment further comprises an insulated door for accessing the interior cavity of the insulated compartment, and wherein the insulated door is flush with a floor of the trunk of the equipped vehicle.

6. The vehicular compartment temperature control system of claim 2, wherein the control controls the at least one cooling element based at least in part on a status of the ignition of the vehicle.

7. The vehicular compartment temperature control system of claim 2, further comprising a camera viewing the interior cavity of the insulated compartment, wherein the control controls the at least one cooling element to cool the interior cavity of the insulated compartment responsive at least in part to determination, via processing of image data captured by the camera, of presence of at least one item in the interior cavity of the insulated compartment.

8. The vehicular compartment temperature control system of claim 2, further comprising a display, wherein the control prompts a user to control the at least one cooling element via the display.

9. The vehicular compartment temperature control system of claim 2, further comprising a display, wherein the display displays the determined temperature of the interior cavity of the insulated compartment.

10. The vehicular compartment temperature control system of claim 2, further comprising at least one receptacle configured to receive removable cooling packs and/or heating packs.

11. The vehicular compartment temperature control system of claim 1, wherein the control determines that the insulated compartment is empty based at least in part on an output of at least one selected from the group consisting of (i) a camera viewing the interior cavity of the insulated compartment and (ii) a weight sensor at a lower portion of the insulated compartment.

12. The vehicular compartment temperature control system of claim 1, wherein the predetermined location is a grocery store.

\* \* \* \* \*

UNITED STATES PATENT AND TRADEMARK OFFICE
CERTIFICATE OF CORRECTION

| | |
|---|---|
| PATENT NO. | : 12,023,986 B2 |
| APPLICATION NO. | : 17/445314 |
| DATED | : July 2, 2024 |
| INVENTOR(S) | : Bishnu Raveendran |

It is certified that error appears in the above-identified patent and that said Letters Patent is hereby corrected as shown below:

In the Claims

<u>Column 6</u>
Line 23, Claim 3, "of claim 2" should be --of claim 1--
Line 30, Claim 4, "of claim 2" should be --of claim 1--
Line 38, Claim 6, "of claim 2" should be --of claim 1--
Line 42, Claim 7, "of claim 2" should be --of claim 1--
Line 50, Claim 8, "of claim 2" should be --of claim 1--
Line 54, Claim 9, "of claim 2" should be --of claim 1--
Line 58, Claim 10, "of claim 2" should be --of claim 1--

Signed and Sealed this
First Day of October, 2024

*Katherine Kelly Vidal*

Katherine Kelly Vidal
*Director of the United States Patent and Trademark Office*